C. C. BALDWIN.
THRESHER.
APPLICATION FILED FEB. 17, 1917.
1,290,485.
Patented Jan. 7, 1919.
2 SHEETS—SHEET 1.
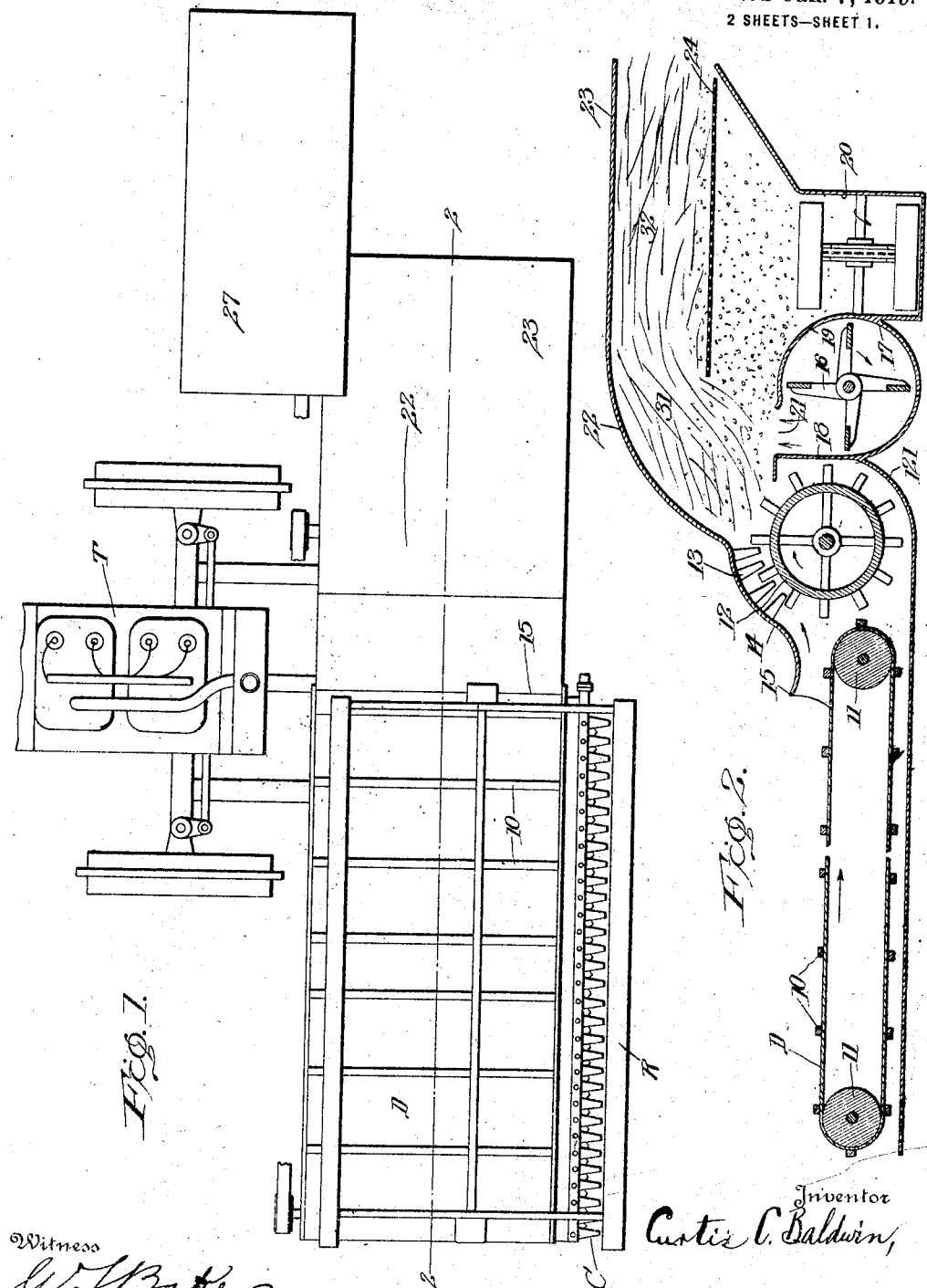

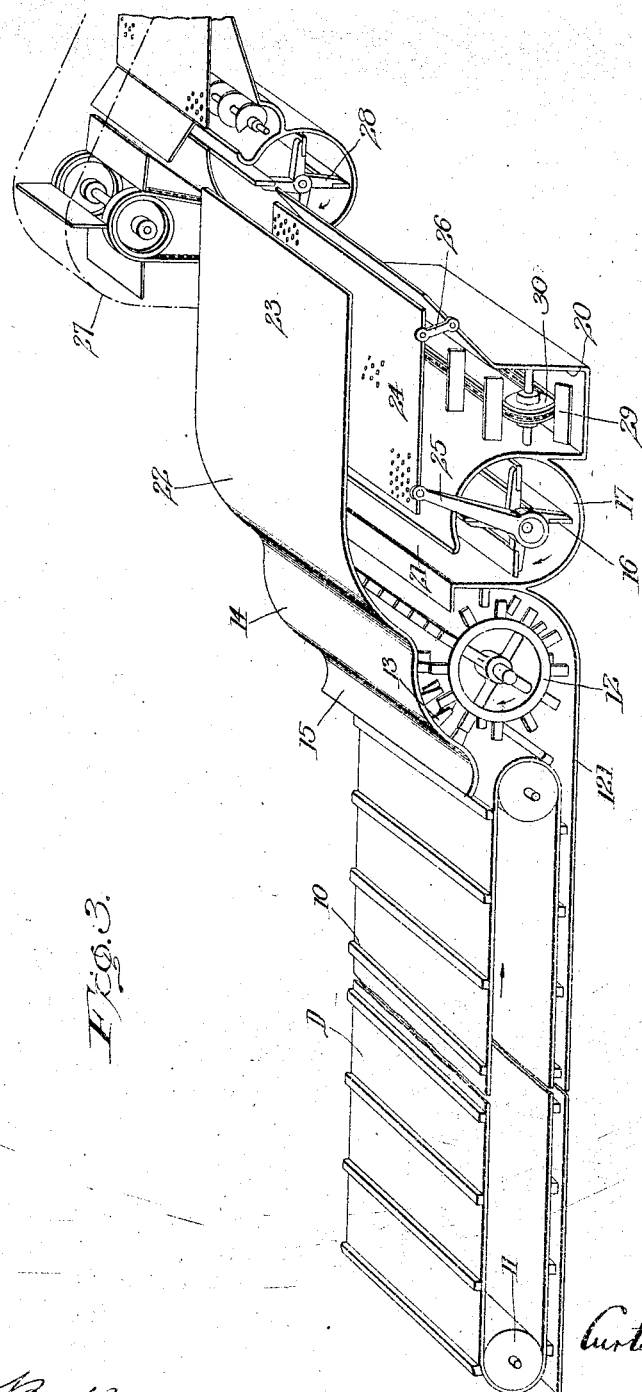

UNITED STATES PATENT OFFICE.

CURTIS C. BALDWIN, OF SPARTA, MICHIGAN.

THRESHER.

1,290,485.  Specification of Letters Patent.  Patented Jan. 7, 1919.

Application filed February 17, 1917. Serial No. 149,311.

*To all whom it may concern:*

Be it known that I, CURTIS C. BALDWIN, a citizen of the United States, residing at Sparta, in the county of Kent and State of Michigan, have invented certain new and useful Improvements in Threshers, of which the following is a description.

This invention relates to a combined thresher and separator and particularly to a threshing and separating mechanism which is adapted to be carried over the field with a harvesting machine.

A threshing and separating mechanism which is carried or driven by the same machine which cuts grain must be very light and it is the principal object of this invention to provide a combination of threshing and separating mechanisms of very light weight but which will effectively thresh the grain as it is cut and immediately thereafter clean the straw and chaff from the grain.

The above and other objects and the novel features of my invention will be apparent from the following description taken in connection with the drawings, in which—

Figure 1 is a plan view of a tractor-driven harvesting, threshing and separating mechanism embodying my invention, Fig. 2 is a sectional view of the machine taken on the line 2—2 of Fig. 1, and Fig. 3 is a perspective view of the threshing and separating mechanism of the machine.

The combined harvester, thresher and separator embodying my invention may be mounted on an ordinary carriage as is generally used on headers, and it may also be carried on the front end of a tractor indicated by the character T in Fig. 1. The wheat or grain is cut the same as in the usual binder or header by the cutting mechanism C from which the grain is thrown rearwardly on to the canvas draper D by a reel R. The draper D consists of an endless canvas belt provided with slats 10 and running over drums 11, one or both of which are driven from the tractor engine to drive the feed belt D in the direction indicated by the arrows in Fig. 2. The draper D therefore constitutes a conveying mechanism for carrying the grain to a high speed toothed threshing cylinder 12. The threshing cylinder coöperates with a toothed concave 13 of the usual or any preferred form. The concave is located on the inner side of the curved part 14 of a casing surrounding the threshing and separating mechanism. Forwardly of the part 14 of the casing there is an upwardly curved part 15 to direct the cut grain into the casing in which the threshing cylinder is located. The threshing cylinder is driven by suitable belting or gearing from the engine of the tractor in a direction so that its forward side moves upwardly. Referring to Fig. 2, it will be seen that the upper run of the draper D feeds the cut grain to the front upwardly moving side of the cylinder 12 at about the center thereof and since the cylinder is rotated at a high velocity, the grain will be carried upwardly by the teeth of the cylinder to the concave 13 which is coextensive with the cylinder, where the grain will be threshed.

After the grain has been drawn through the teeth of the concave 13 and threshed, the grain, straw and chaff are thrown in a stream rearwardly, tangentially and horizontally from the upper side of the cylinder. In order to separate the straw and chaff from the threshed grain, a fan 16 is employed which is rotated at a high speed in the direction indicated by the arrow by suitable shafting or belting driven by the tractor engine T. The fan 16 is mounted within a circular casing 17, the front wall 18 of which constitutes the rear wall of the threshing cylinder casing 121 and part of the rear wall 19 of which constitutes the front wall of the casing of the hopper or trough 20. The fan housing 17 has an outlet 21 which is located directly to the rear of the discharging side of the threshing cylinder 12. By positioning the outlet 21 at this point, the current of air produced by the fan 16 will be forced vertically upwardly through the horizontally thrown stream of straw, chaff, and grain. This upward current of air carries the straw, chaff and some of the light particles of grain upwardly against the force of gravity in the manner indicated in Fig. 2. The velocity of the current of air and the velocity of the straw, chaff and grain are such that the air will carry the straw and chaff with it and may also carry some light particles of grain but most of the grain will pass through the current of air and be deposited by gravity in the trough or hopper 20 directly beyond the outlet 21 of the fan housing.

The upwardly flowing current of air carrying chaff, straw and lighter particles of grain is deflected rearwardly by the curved part 22 of the separator or casing so that it will flow in a conduit formed by the top part 23 of the casing and by a shaking riddle or screen 24. The screen 24 is carried by the links 25 and 26 directly above the trough or hopper 20 and as the current of air passes over it, the grain will be deposited thereon and pass through the perforations into the hopper below as the screen is shaken. The straw and chaff passes out through the end of the conduit formed by the screen 24 and top 23.

At the rear and to one side of the separator casing there is a casing 27 adjoining another fan 28 which is adapted to further clean the grain. The grain is fed from the trough or hopper 20 to the mechanism in the casing 27 by means of a conveying device 29 traveling around the pulley 30.

It will be seen that I have provided a novel arrangement of mechanisms for cutting, threshing and cleaning grain in which the weight of the combination is reduced to a minimum. By my method of cleaning the straw and chaff from the grain while the threshed grain, straw and chaff have the high velocity imparted to them by the threshing cylinder, a machine is provided which will handle the grain as it is cut, thresh it and clean it. I believe that my principle of separating the grain from the straw and chaff while it has a high velocity is novel. The grain being heavy will not be materially affected by the blast and will pass into the trough or receiver but the chaff and straw being light and not having much of a velocity compared with the velocity of the current of air will be blown upward through the space 31 and out through the conduit 32 on to the ground.

The separating mechanism is principally designed to be applied to machines which thresh the grain as it is cut, however, while I have shown the arrangement in detail, I do not wish to be limited to the exact construction shown as it is obvious that the arrangement may be carried out in other ways without departing from the spirit of the invention.

Having thus described the invention, what is claimed and desired to be secured by Letters Patent is:

1. The herein described method of separating straw and chaff from grain which comprises subjecting the mixed materials to a blast of air, moving transversely of the path of said materials, and completely in advance of a vibrating screen or separator whereby the heavier particles of grain will be separated from the lighter materials which are carried over the screen.

2. In a threshing machine, the combination of a threshing cylinder and concave, a vibrating screen in rear of the cylinder and concave, and means for directing a blast of air into the space between the screen and the cylinder and concave in a direction substantially at right angles to the plane of the screen, for the purpose described, the forward end of the screen being continuously in rear of the upwardly moving air blast.

3. In a threshing machine, the combination of a threshing cylinder and concave, a substantially horizontal vibrating screen arranged in rear of the cylinder and concave, and a blast fan having its casing provided with an upwardly directed outlet communicating with the space between the screen and cylinder and concave, the forward wall of said outlet being in a substantially vertical plane.

4. In a threshing machine, the combination of a threshing cylinder and concave, a vibrating screen in the rear of the cylinder and concave, means, comprising a casing having an opening in its top and a fan in said casing, for directing a blast of air substantially vertically across the space between the forward end of the screen and the cylinder and concave, to separate a portion of the grain from the straw and chaff, and means for directing said air blast and the material carried thereby over the screen, the forward end of the screen being continually in rear of the vertical plane of the outlet from the fan casing.

5. In a threshing machine, the combination of a threshing cylinder and concave adapted to discharge grain, straw and chaff upwardly and rearwardly, a substantially horizontal vibrating screen arranged in rear of and in a plane above that of the cylinder and concave, and a blast fan having its outlet directed upwardly in the space between the forward end of the screen and the cylinder and concave, said forward end if the screen being at all times in rear of the plane of the rear wall of said fan outlet.

In testimony whereof I affix my signature.

CURTIS C. BALDWIN.